March 7, 1961
H. C. HEINTZELMAN
2,973,952
SHOCK ABSORBER AND RETAINER THEREFOR
Filed April 1, 1959
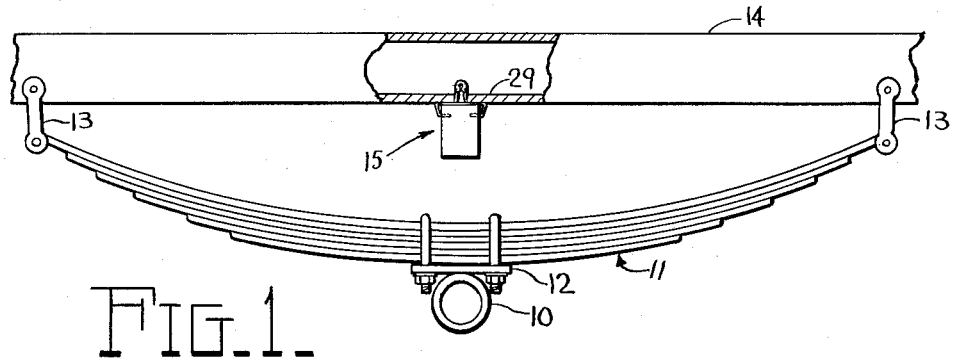
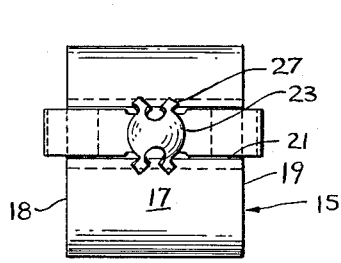
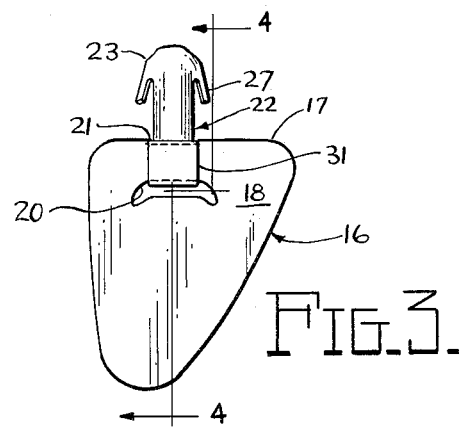
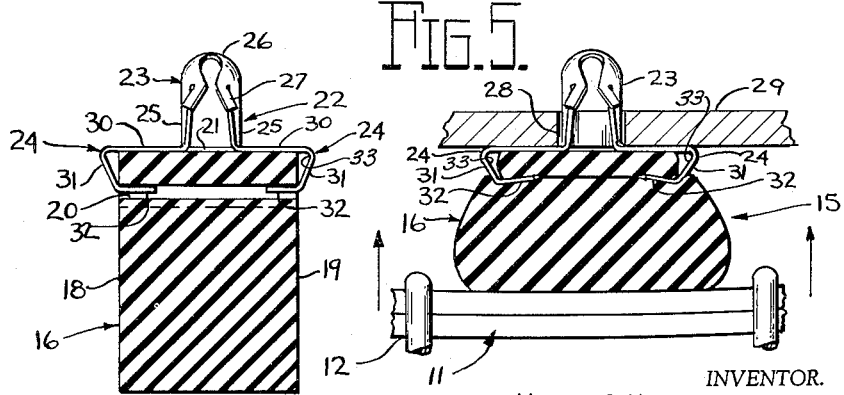
INVENTOR.
HENRY C. HEINTZELMAN
BY Owen & Owen
ATTORNEYS

United States Patent Office 2,973,952
Patented Mar. 7, 1961

2,973,952

SHOCK ABSORBER AND RETAINER THEREFOR

Henry C. Heintzelman, North Baltimore, Ohio, assignor to Cooper Tire & Rubber Company, Findlay, Ohio, a corporation of Delaware Filed Apr. 1, 1959, Ser. No. 803,481

3 Claims. (Cl. 267—30)

This invention relates to shock absorbers and retainers therefor, and particularly to a shock absorber having a body of resilient, deformable material and a metallic retainer by which the shock absorber can be readily attached to position it for absorbing shocks.

Although a shock absorber embodying the invention has many uses, for example as spacers in shipping stacked or nested items to absorb the shock of impacts, its use will be illustrated in the drawings as a shock absorber to prevent the axle of an automobile from slamming against a frame girder when the automobile spring "bottoms out."

Shock absorbers of the same general type as those embodying the invention have been used for many years, usually being held in place by a bolt, the head of which is embedded in the resilient mass and the threaded shank of which extends through a hole in the object of which the absorber is to be attached. The use of such an embedded bolt is expensive because of the cost of the bolt and the nuts used with it. Assembly is slow and, unfortunately, after but a few heavy blows, the body of the resilient shock absorber is torn away from the head of the bolt embedded therein.

In another type of absorber, the resilient body is held in place by a spring clip member. These spring clip members usually are made in the form of a C, embracing the resilient body and having means for retaining the clip in place. The absorbers are held in place by these steel clips quite readily when they are not subjected to any blows. Under the repeated blows to which the resilient body is subjected, the material deforms and causes "cold working" of the arms of the C clip, which eventually results in fracture. When the resilient body is crushed under a heavy blow, its extreme malformation usually distorts the clip to such an extent that the resilient body is released or the clip is fractured. This same type of objection applies to other types of retainers or fasteners for absorbers wherein the retaining clip extends into a T-shaped slot at one side of the resilient body.

It is, therefore, an object of the instant invention to provide a shock absorber comprising a block of resilient, deformable material and a retainer for the body so designed that deformations of the body caused by repeated blows are accommodated without cold working the retainer so that its life is greatly increased over prior retainers, and extreme deformations of the body act to cause the retainer to more securely hold the body rather than less securely hold it.

It is another object of the instant invention to provide an inexpensive, simple, resilient shock absorber which can be made from a cut-off section of a simple extrusion and a practical, inexpensive retainer clip which can be readily inserted in a drilled hole to retain the absorber in place, which is not subject to failure from cold working and which grasps the shock absorber even more tightly upon the occasion of a heavy blow.

These and other more specific objects and advantages of the invention will be apparent from the following detailed description, and from the accompanying drawings in which:

Fig. 1 is a fragmentary view in elevation, with parts broken away, of part of an automobile showing the axle and spring and indicating the use of a shock absorber embodying the invention for absorbing the shock of "bottoming out" the spring and axle;

Fig. 2 is a plan view of a shock absorber embodying the invention, shown on an enlarged scale;

Fig. 3 is a side view in elevation taken from the left side of Figure 2;

Fig. 4 is a vertical, sectional, transverse view taken along the line 4—4 of Fig. 3 and showing a shock absorber embodying the invention in its rest position; and Fig. 5 is a view similar to Figure 4, but showing the shock absorber embodying the invention at the time of absorbing a heavy shock.

Conventionally, in automotive and similar vehicles the vehicle axle 10 (Fig. 1) is attached to a leaf spring 11 by a suitable shackle 12. The leaf spring may be attached by links 13 to a frame girder 14 of the vehicle. Because the vehicle is subjected to very severe shocks when it strikes bad holes in the road or similar obstructions, it is possible that the shock may be heavy enough to "bottom out" the spring 11, i.e., to flex it upwardly to such an extent that its center portion adjacent the shackle 12 would strike the under side of the girder 14.

In order to prevent such bottoming out shocks, spring arrangements of the type illustrated in Figure 1 are often provided with shock absorbers. A shock absorber 15 embodying the invention is shown in place in Figure 1 and in detail in Figures 2–5.

The shock absorber 15 comprises a shaped body 16 of resilient, deformable material having a generally planar top face 17 with end faces 18 and 19 extending perpendicularly to the face 17. The body 16 may be formed by extruding a mass of resilient, deformable material from an extrusion die and then slicing the long extruded mass transversely to its length to form the nearly parallel end faces 18 and 19. The profile of the body 16 as shown in Fig. 3 is determined by the particular shock absorbing function the body is to perform and the severity and direction from which the blows are to be received.

Extending longitudinally through the body 16 from end to end, i.e., between the faces 18 and 19, there is an opening 20. The block 16 may also have a recess 21 cut in its upper face 17 extending from end to end thereof parallel to and spaced from the opening 20.

The shock absorber body 16 is retained in place by a retainer generally indicated at 22, which is fabricated from sheet metal having spring resiliency. The retainer 22 comprises a central body portion 23 and a pair of divergent arms 24. The central body 23 is shaped generally like a spear point having a pair of opposed side members 25, a curved-over nose 26 and swung-out barbs 27. The central body 23 has a horizontal dimension determined by the diameter of a hole 28 through a web 29 of the girder 14 or through a similar web or some other structure to which the shock absorber is to be attached. The space between the upper surfaces of the divergent arms 24 and the lower ends of the barbs 27 is determined by the thickness of the particular material against which the shock absorber is to be fastened by the retainer 22.

Each of the divergent arms 24 has a planar section 30 which overlies and extends from the center beyond the end of the planar face 17. Each of the arms 24 has a downwardly turned section 31 extending across those portions of the end faces 18 and 19 between the planar face 17 and the opening 20. On the end of the downwardly turned section 31 each of the arms 24 has an end 32 turned into the end of the opening 20.

Deformations of the body 16 under the repeated light blows of normal use do not cause cold working of the arms 24 and resulting fracture, as in prior art retainers where the arms closely embrace the bodies, because the material of the body 16 can bulge into the open spaces 33 defined by the ends of the horizontal sections 30 and the adjacent sections 31.

Under severe shock the shock absorber body 16 is distorted to the position indicated in Figure 5, being crushed upwardly and outwardly. Portions of the body 16 below the opening 20 and at the lateral sides thereof are deformed upwardly and into contact with the outer sides of the portions 31 of the divergent arms 24. Because the portions 31 are angled inwardly they are free to bend rather than break and their ends 22 are, therefore, forced into the ends of opening 20 even more tightly under extreme conditions.

I claim:

1. A shock absorber comprising a block of resilient, deformable material having a substantially planar face and two adjacent end faces substantially normal to said planar face and substantially parallel to each other, there being an opening extending through said block from one end to the other spaced from and parallel to said planar face, and a sheet metal block retainer having spring resiliency, said retainer having a central body portion adapted to be inserted in a circular aperture for retaining said shock absorber therein and a pair of divergent arms, said arms having planar sections extending over said planar face, downwardly turned sections extending across said end faces between said planar face and such opening, the junctions between said planar sections and said downwardly turned sections being spaced from the corners of said block at the junction of the end faces and the ends of said planar face whereby the deformable material is maintained out of engagement with said junctions under a light impact, and ends turned inwardly into the ends of such opening, the downwardly turned sections of said arms being inclined inwardly from the said first named junctions toward said end faces of said block, with the inner corners at the junctions of the downwardly turned sections and ends contacting the corners of said block at the junction of the end faces and the upper sides of the opening through the block, whereby the deformable material engages a portion of the outer surfaces of said downwardly turned sections adjacent said inner corners under a heavy impact to force said ends into said opening.

2. A shock absorber according to claim 1 in which said block has a recess in its planar face extending parallel to the opening through said block from end to end and the planar sections of the divergent arms lie in said recess.

3. A shock absorber according to claim 1 in which the ends of said divergent arms are parallel to the planar sections of said divergent arms and said ends and planar sections snugly embrace a part of said block therebetween.

References Cited in the file of this patent
UNITED STATES PATENTS 2,659,595    Coda _____ Nov. 17, 1953

FOREIGN PATENTS 716,767    Great Britain _____ Oct. 13, 1954